(12) United States Patent
Fukuda

(10) Patent No.: US 7,796,016 B2
(45) Date of Patent: Sep. 14, 2010

(54) RADIO COMMUNICATION SYSTEM, RADIO COMMUNICATION DEVICE, AND RADIO COMMUNICATION METHOD

(75) Inventor: Kunio Fukuda, Tokyo (JP)

(73) Assignee: Sony Corporation (JP)

( * ) Notice: Subject to any disclaimer, the term of this patent is extended or adjusted under 35 U.S.C. 154(b) by 1539 days.

(21) Appl. No.: 11/116,517

(22) Filed: Apr. 28, 2005

(65) Prior Publication Data

US 2005/0253688 A1 Nov. 17, 2005

(30) Foreign Application Priority Data

May 11, 2004 (JP) ............................ P2004-140580

(51) Int. Cl.
*H04Q 5/22* (2006.01)
(52) U.S. Cl. .................. 340/10.4; 340/10.1; 340/572.1; 455/106; 455/45
(58) Field of Classification Search ................ 340/10.1, 340/10.4, 572.1; 455/45, 106; 375/283, 375/281, 315
See application file for complete search history.

(56) References Cited

U.S. PATENT DOCUMENTS

| | | | |
|---|---|---|---|
| 4,728,955 A | * | 3/1988 | Hane ........................... 342/140 |
| 5,861,781 A | | 1/1999 | Ashby |
| 5,940,006 A | * | 8/1999 | MacLellan et al. .......... 340/10.1 |
| 6,456,668 B1 | * | 9/2002 | MacLellan et al. .......... 375/283 |
| 2002/0142747 A1 | | 10/2002 | Nilson et al. |

FOREIGN PATENT DOCUMENTS

| | | |
|---|---|---|
| EP | 0 779 520 | 6/1997 |
| EP | 0 851 639 | 7/1998 |
| JP | 63-121773 A | 5/1988 |
| JP | 63-279621 A | 11/1988 |
| JP | 06-123773 A | 5/1994 |
| JP | 10-209914 A | 8/1998 |

OTHER PUBLICATIONS

European Search Report, EP 05 25 2825, Sep. 2008.

\* cited by examiner

*Primary Examiner*—Edwin C Holloway, III
(74) *Attorney, Agent, or Firm*—Lerner, David, Littenberg, Krumholz & Mentlik, LLP

(57) ABSTRACT

A radio communication system performs data communication by a backscatter system using absorption and reflection of a received radio wave. In the system, a data reading device transmits an unmodulated carrier of frequency $f_O$; a data transmitting device subjects transmission data to primary modulation using a center frequency $f_S$ to obtain a primary modulated signal, and subjects the primary modulated signal to secondary modulation by multiplying the primary modulated signal by an input of the unmodulated carrier of the backscatter system to generate a reflected modulated wave in which one of frequencies $f_O+f_S$ and $f_O-f_S$ is suppressed; and the data reading device receives the reflected modulated wave from the data transmitting device.

12 Claims, 5 Drawing Sheets

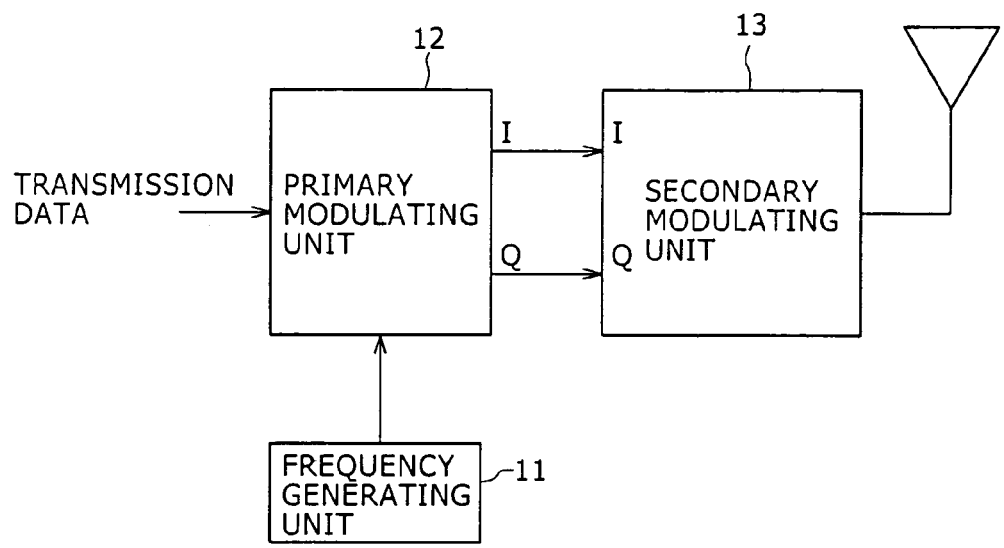
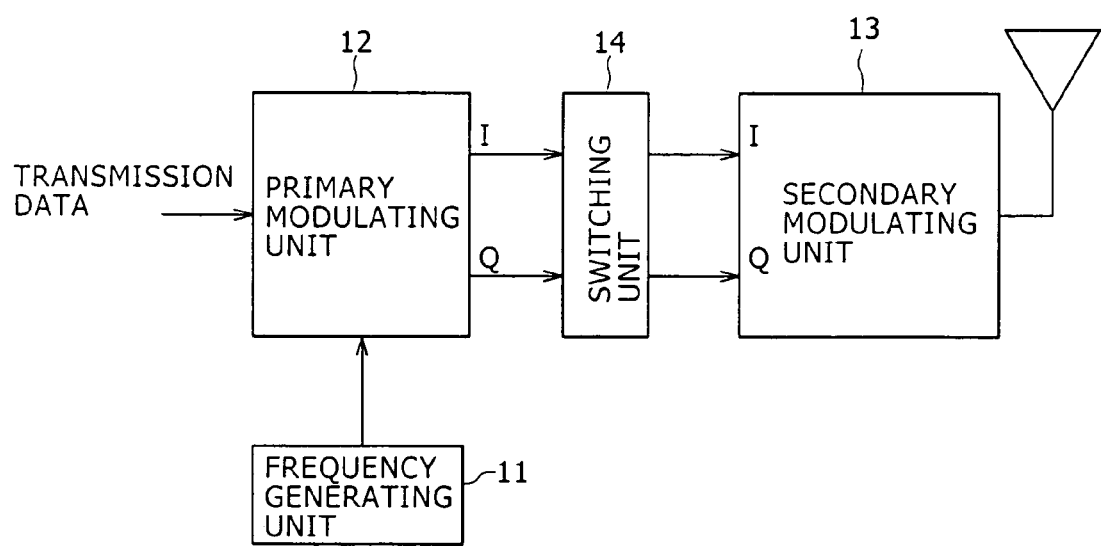

RADIO COMMUNICATION SYSTEM, RADIO COMMUNICATION DEVICE, AND RADIO COMMUNICATION METHOD

CROSS-REFERENCE TO RELATED APPLICATIONS

The present application claims priority from Japanese Application No. 2004-140580 filed May 11, 2004, the disclosure of which is hereby incorporated by reference herein.

BACKGROUND OF THE INVENTION

The present invention relates to a radio communication system, a radio communication device, and a radio communication method using microwaves in a specific frequency band, and particularly to a radio communication system, a radio communication device, and a radio communication method for realizing communication operation with low power consumption between devices at a relatively short distance. More particularly, the present invention relates to a radio communication system, a radio communication device, and a radio communication method that perform data communication by a backscatter system using transmission of an unmodulated carrier from a reading device side, and absorption and reflection of the received radio wave on the basis of an operation of terminating an antenna on a transmitting device side, and particularly to a radio communication system, a radio communication device, and a radio communication method that eliminate the effects of transmitter noise on the reading device side to improve reception sensitivity and increase the communication distance.

One example of radio communication means applicable in only a limited area is RFID. RFID is a system including a tag and a reader in which the reader reads information stored in the tag in a non-contact manner. While the system is also referred to as an "ID system," a "data carrier system" and the like, a universally common name for the system is an RFID system. The RFID system may be abbreviated as RFID. Incidentally, the RFID system is an "identification system using high frequencies (radio waves)." Methods of communication between a tag and a reader/writer include, for example, an electromagnetic coupling type, an electromagnetic induction type, and a radio frequency communication type (see, for example, Klaus Finkenzeller (Translated from the 3rd German edition by Rachel Waddington, Swadlincote, UK) "Fundamentals and Applications in Contactless Smart Cards and Identification" (Wiley & Sons LTD)).

An RFID tag is a device including unique identifying information, and has an operating characteristic of oscillating a radio wave at a modulation frequency corresponding to the identifying information in response to reception of a radio wave of a specific frequency. On the basis of the oscillation frequency of the RFID tag, a reading device side can identify the RFID tag. Hence, a system using RFID makes it possible to identify an article, an owner, and the like using a unique ID written in the RFID tag. The RFID system is now used in many systems including, for example, a system for monitoring the entering and leaving of a room, an article identifying system in distribution, a bill payment system in restaurants and the like, and a system for preventing takeout before payment in stores selling CDs, software and the like.

A radio identification device of a small size can be produced by packaging an IC chip having a transmission and reception function and a memory function, a source for driving the chip, and an antenna (see for example, Japanese Patent Laid-Open No. Hei 6-123773). According to this radio identification device, it is possible to transmit various data on an article or the like to receiving means of the IC chip via the antenna, to store the output in a memory, to read the data in the memory and to supply the data to the outside by radio via the antenna as required. Hence, the presence and position of the article or the like can be checked and traced quickly and easily.

An RFID system includes an RFID tag and a tag reader. When the tag receives an unmodulated wave $f_O$ transmitted from the tag reader, the unmodulated wave $f_O$ is rectified and converted into direct-current power, and the direct-current power can be used as operating power of the tag. The tag side performs an operation of terminating an antenna according to a bit image of transmission data, and thus uses absorption and reflection of the received radio wave to represent the data. Specifically, when the data is 1, the tag terminates the antenna by an antenna impedance to absorb the radio wave from the tag reader. When the data is 0, the tag reflects the radio wave from the tag reader by setting a terminal of the antenna in an open state. A signal of the same frequency as that of the signal transmitted from the tag reader is returned by the reflection of a backscatter system. A communication method of representing data by a pattern of absorption and reflection of the thus arrived radio wave is referred to as a "backscatter system." Thus, the tag can transmit information therewithin to the reader side without a power supply.

Conventionally, a radio communication system of the backscatter system is limited in communication range to a relatively short distance, and is thus often applied to identification and authentication of an article, a person and the like, as is typified by the RFID tag.

On the other hand, the RFID tag generally has no power supply, and is supplied with power from the radio wave from the reader. This power is supplied from a battery within the device, whereby radio data transmission with low power consumption by the backscatter system can be realized. That is, when the communication distance is limited, radio communication of the backscatter system has a characteristic of being able to establish a radio transmission line with a very low power consumption. Recently, with improvements in packaging technology, IC chips having a memory function have appeared, and also the memories of the IC chips have been increasing in capacity. There is hence a desire to not only communicate relatively short data, such as identifying and authenticating information, but also to adopt the communication of the backscatter system for general data transmission. For example, the communication of the backscatter system is useful in transmitting images from a digital camera or a portable telephone to a PC, a printer, a TV or the like.

The communication system based on the backscatter system performs data communication using absorption and reflection of the received radio wave on the basis of the operation of terminating the antenna as a fundamental operation. Generally, the frequency of a carrier from the reader and the center frequency of the reflected wave are the same, and the reader side performs transmission and reception at the same frequency.

In such a case, a receiving unit is affected by the transmission frequency that goes around into the receiving unit from a transmitting side, and needs to process the reflected wave having a weak power. That is, the receiving unit is easily affected by a DC offset and transmitter noise, thus making it difficult to increase the transmission distance. In addition, a modulation system in the backscatter system is generally an ASK modulation system or a PSK modulation system in most cases, thus making it difficult to increase speed.

FIG. 7 shows an example of the configuration of a radio communication system of a conventional backscatter system.

Reference numeral 500 denotes a radio transmission device on a mobile device side. Reference numeral 510 denotes a radio transmission and reception device on a reader side. Suppose that data transmission is performed by the backscatter system from the radio transmission device 500 to the radio transmission and reception device 510.

The radio transmission device 500 is connected to an application unit 503, such as a digital camera or the like. Similarly, the radio transmission and reception device 510 is connected to an application unit 519, such as a printer or the like.

The radio transmission and reception device 510 includes an antenna 511, a circulator 512 for separating a transmitted wave and a received wave from each other, a receiving unit 514, a local oscillator 513 shared for transmission and reception by the receiving unit 514 and a transmitting unit 517, and a baseband processing unit 518. Suppose in the example shown in the figure that the receiving unit 514 and the transmitting unit 517 both use a direct conversion system. Further, the receiving unit 514 includes a quadrature demodulation unit 515 and an AGC amplifier 516. An unmodulated carrier is transmitted to the radio transmission device 500 by turning on the transmitting unit 517 by the baseband processing unit 518 and thereby transmitting frequency $f_O$ of the local oscillator 513 from the antenna 511 via the circulator 512.

The transmitted unmodulated carrier $f_O$ reaches the radio transmission device 500. The radio transmission device 500 includes an antenna 501 and a backscatter modulator 502. The backscatter modulator 502 performs backscatter ASK, PSK, or QPSK modulation according to transmission data of the application unit 503. The modulation can be easily performed by on/off operation of a diode, a GaAs switch or the like. Thus, a modulated wave eventually reflected from the antenna 501 is generated with the center frequency $f_O$ of the unmodulated carrier as a center.

In the radio transmission and reception device 510, the backscattered modulated wave having the center frequency $f_O$ is received by the antenna 511, the circulator 512, and the receiving unit 514. The quadrature demodulation unit 515 is supplied with the frequency $f_O$ of the local oscillator 513, performs direct conversion reception, and generates an I' signal and a Q' signal of a baseband signal.

The I' signal and the Q' signal of the baseband signal are amplified to a desired level by the AGC amplifier 516 in a succeeding stage. Thereby, an I signal and a Q signal of the baseband signal are obtained. The I signal and the Q signal of the baseband signal are supplied to the baseband processing unit 518. The baseband processing unit 518 performs demodulation, and then supplies received data and a received clock to the application unit 519.

The unmodulated carrier $f_O$ from the transmitting unit 517 is emitted from the antenna 511 via the circulator 512, and also goes around into the receiving unit 514 side. This component going around into the receiving unit 514 side can be reduced to a degree by the circulator 512. However, the value of the reduction is not infinite, and an isolation of about 20 dB is an actual value.

FIG. 7 also shows a frequency spectrum on the reader side. Reference numeral 520 denotes the frequency spectrum at an input terminal of the quadrature demodulation unit 515. Reference numeral 521 denotes the modulated wave reflected by backscatter, for example, a BPSK modulated wave. Reference numeral 522 denotes the unmodulated carrier. When the modulated signal 521 is small, the unmodulated carrier 522 has a larger value.

This unmodulated carrier $f_O$ enters the quadrature demodulation unit 515 to be mixed with the local frequency $f_O$ of the local oscillator 513. Consequently, a high direct-current voltage is generated. This forms a DC offset, which produces a great adverse effect on operation of the quadrature demodulation unit 515. Thus, the very small modulated signal becomes distorted and difficult to demodulate, thereby constituting a major impediment to increasing the transmission distance.

As one method for solving such a problem, there is a method of shifting the reception frequency $f_O$ by a predetermined center frequency $f_S$ in either a positive direction or a negative direction, and returning a reflected wave on the tag side. In this case, the frequency of the reflected wave received on the tag reader side is not the same as the transmission frequency. Therefore, effects of a DC offset and transmitter noise are avoided, so that the reflected wave can be received with a high sensitivity. Thus, the transmission distance can be increased.

For example, a method of first performing QPSK modulation using a subcarrier and then performing ASK or PSK modulation by the backscatter system as secondary modulation has been proposed (see, for example, Japanese Patent Laid-Open No. Hei 10-209914).

FIG. 5 shows an example of the configuration of an RFID system in which the tag side shifts the reception frequency $f_O$ by a predetermined center frequency $f_S$ in either a positive direction or a negative direction, and returns a reflected wave.

Reference numeral 100 denotes a radio transmission device on a mobile device side. Reference numeral 110 denotes a radio transmission and reception device on a reader side. Suppose that data transmission is performed by the backscatter system from the radio transmission device 100 to the radio transmission and reception device 110. The radio transmission device 100 is connected to an application unit 105, such as a digital camera or the like. Similarly, the radio transmission and reception device 110 is connected to an application unit 119, such as a printer or the like.

The radio transmission and reception device 110 includes an antenna 111, a circulator 112 for separating a transmitted wave and a received wave from each other, a receiving unit 114, a local oscillator 115 for the receiving unit 114, a transmitting unit 116, a local oscillator 117 for the transmitting unit 116, and a baseband processing unit 118. Suppose in this case that the receiving unit 114 and the transmitting unit 116 both use a direct conversion system.

An unmodulated carrier is transmitted to the radio transmission device 100 by turning on the transmitting unit 116 by the baseband processing unit 118 and transmitting frequency $f_O$ of the local oscillator 117 from the antenna 111 via a band-pass filter 113 and the circulator 112. The transmitted unmodulated carrier $f_O$ reaches the radio transmission device 100. The band-pass filter 113 is provided to reduce the effects of transmitter noise on the receiving unit 114.

The radio transmission device 100 includes an antenna 101, a backscatter modulator 102, a subcarrier QPSK modulator 103, and a subcarrier oscillator 104.

The subcarrier QPSK modulator 103 performs QPSK modulation at a subcarrier frequency $f_S$. Data to be subjected to the QPSK modulation is received from the application unit 105 as transmission data (TXDATA) and a transmission clock (TXCLK).

Generally, QPSK modulation requires a 90° phase shift. However, when QPSK modulation is performed by a digital circuit, the 90° phase shift can be easily created from a clock of four times $f_S$. Also, an analog delay line may be used.

A generated QPSK modulated wave having a center frequency $f_S$ is subjected to ASK modulation by the backscatter modulator 102. The backscatter modulation can be easily performed by using a diode, a GaAs switch or the like (known). Thus, the QPSK modulated wave eventually reflected from the antenna 101 is generated in both sidebands of the frequency $f_O$ of the unmodulated carrier, that is, two bands of center frequencies $f_O+f_S$ and $f_O-f_S$.

In the example shown in FIG. 5, $f_O+f_S$ of the modulated wave divided into both sidebands is used. The modulated wave of $f_O-f_S$ can be removed by using a band-pass filter 106 inserted between the antenna 101 and the backscatter modulator 102, for example. However, a loss from insertion of the band-pass filter 106 occurs twice, causing a decrease in reflection efficiency. In addition, the insertion of the band-pass filter 106 increases the device cost.

In the radio transmission and reception device 110, the backscattered modulated wave of $f_O+f_S$ is received by the antenna 111, the circulator 112, and the receiving unit 114.

The receiving unit 114 performs direct conversion reception at the frequency $f_O+f_S$ of the local oscillator 115. The QPSK modulated wave is converted into baseband signals I and Q. The baseband signals I and Q are sent to the baseband processing unit 118.

The baseband processing unit 118 performs QPSK demodulation processing (carrier synchronization and symbol synchronization), thereby generating received data RXDATA and a received clock RXCLK, and then supplies the received data RXDATA and the received clock RXCLK to the application unit 119.

However, the above-described method of shifting the unmodulated carrier of the frequency $f_O$ from the tag reader side by $f_S$ on the tag side and returning the reflected wave has the following problems.

(1) The reflected modulated wave appears in a state of being divided into both sidebands shifted by the subcarrier frequency to the plus side and the minus side from the center of the unmodulated carrier from the reader. Since the necessary modulated wave is on only one side, the other side needs to be cut off by the filter. However, when the filter is used in the backscatter system, a loss from the insertion of the filter occurs in both directions, causing a decrease in reflection efficiency. In addition, an increase in the cost of the filter is a problem.

(2) The energy of the reflected wave is divided into both sidebands. Thus, when only one side is used, the energy allocated to the unused other side constitutes a power loss, thus causing a decrease in the power of the reflected wave. For example, the power of the reflected wave may be decreased by at least 3 dB. The backscatter system using ASK causes a greater decrease in the power.

FIG. 6 shows the spectrum of the reflected wave in the RFID system shown in FIG. 5. Suppose that the backscatter modulation system is ASK. Reference numeral 200 denotes a returned component of the unmodulated carrier of the frequency $f_O$ transmitted from the radio transmission and reception device 110. Reference numeral 201 denotes the QPSK modulated wave of the center frequency $f_O+f_S$. Reference numeral 202 denotes the QPSK modulated wave of the center frequency $f_O-f_S$.

As shown in the figure, the unmodulated carrier transmitted from the radio transmission and reception device 110 is divided into the components 200, 201, and 202 and then reflected. Therefore, the modulated signal on one side has a low level. That is, the level of the originally very weak reflected wave is further lowered, which is one cause of the decrease in communication distance.

SUMMARY OF THE INVENTION

It is desirable to provide a radio communication system, a radio communication device, and a radio communication method that are excellent in suitably performing data communication by a backscatter system using transmission of an unmodulated carrier from a reading device side, and absorption and reflection of the received radio wave on the basis of an operation of terminating an antenna on a transmitting device side.

It is also desirable to provide a radio communication system, a radio communication device, and a radio communication method that are excellent in eliminating effects of transmitter noise on the reading device side to improve reception sensitivity and increase the communication distance.

It is also desirable to provide a radio communication system, a radio communication device, and a radio communication method that are excellent in eliminating the effects of a DC offset and transmitter noise on the tag reader side to improve the reception sensitivity and increase the communication distance by shifting an unmodulated carrier of frequency $f_O$ from the tag reader side by $f_S$ on the tag side and returning a reflected wave.

It is also desirable to provide a radio communication system, a radio communication device, and a radio communication method that are excellent in making it possible to improve the reception sensitivity and increase the communication distance by improving reflection efficiency and preventing a power loss of the reflected wave when shifting the unmodulated carrier of frequency $f_O$ from the tag reader side by $f_S$ on the tag side and returning the reflected wave.

The present invention has been made in view of the above problems. According to an embodiment of the present invention, there is provided a radio communication system for performing data communication by a backscatter system using absorption and reflection of a received radio wave, the radio communication system including a data reading device operable to transmit an unmodulated carrier of frequency $f_O$; and a data transmitting device operable to subject transmission data to primary modulation using a center frequency $f_S$ to produce a primary modulated signal, and to subject the primary modulated signal to secondary modulation by multiplying the primary modulated signal by an input of the unmodulated carrier of the backscatter system to generate a reflected modulated wave in which one of frequencies $f_O+f_S$ and $f_O-f_S$ is suppressed; the data reading device being further operable to receive the reflected modulated wave from the data transmitting device.

The system herein refers to a logical set of a plurality of apparatuses (or functional modules for realizing specific functions) regardless of whether each apparatus or functional module is present within the same housing.

The radio communication system according to the embodiment of the present invention is applicable to an RFID system in which the tag can perform data communication without a power supply by the backscatter system. The data transmitting device corresponds to the tag, and the data reading device corresponds to a tag reader.

In an ordinary RFID system, the frequency of a carrier from the reader and the center frequency of the reflected wave are the same, and since the reader side performs transmission and reception at the same frequency, a receiving unit of the tag reader needs to process a reflected wave having weak power while being affected by a DC offset and transmitter noise.

On the other hand, the radio communication system according to the embodiment of the present invention eliminates the effects of a DC offset and transmitter noise on the tag reader side by shifting the unmodulated carrier of the frequency $f_O$ from the tag reader side by $f_S$ on the tag side and then returning the reflected wave. It is thereby possible to improve reception sensitivity and increase transmission distance.

In addition, when the unmodulated carrier is shifted by $f_S$ on the tag side and the reflected wave is returned, the reflected modulated wave appears in a state of being divided into two sidebands shifted by the subcarrier frequency to the plus side and the minus side from the center of the unmodulated carrier. Thus, there are problems of a power loss due to the division of the energy of the reflected wave into two sidebands and an increase in cost due to the cutting of one side by a filter.

On the other hand, in the present invention, the data transmitting device subjects transmission data to primary modulation with a center frequency $f_S$, and performs secondary modulation by multiplying the signal resulting from the primary modulation by the unmodulated carrier. At this time, the data transmitting device generates a modulated signal of a reflected wave in which one of frequencies $f_O+f_S$ and $f_O-f_S$ is suppressed, and then transmits the modulated signal of the reflected wave. It is therefore possible to improve reflection efficiency and prevent a power loss of the reflected wave, and thus improve reception sensitivity and increase transmission distance. In addition, since a reflected wave on one side of the two divided sidebands does not need to be removed by a filter, an increase in cost can be prevented.

The data transmitting device subjects transmission data to primary modulation by one of a BPSK system and a QPSK system using a center frequency $f_S$. The data transmitting device thereby generates transmission data I. Also, the data transmitting device generates transmission data Q by giving a phase difference of 90 degrees to the transmission data I.

Further, the data transmitting device generates a modulated signal of a reflected wave in which one of frequencies $f_O+f_S$ and $f_O-f_S$ is suppressed by multiplying the transmission data by inputs I and Q of the unmodulated carrier for quadrature modulation by the backscatter system.

The reflected modulated wave of one of the frequencies $f_O+f_S$ and $f_O-f_S$ can be selectively generated by changing a combination in which the inputs I and Q of the unmodulated carrier for quadrature modulation and the transmission data I and Q resulting from the primary modulation are multiplied together.

For example, by multiplying together the input I of the unmodulated carrier to be quadrature-modulated and the primary modulated transmission data I, and multiplying together the input Q of the unmodulated carrier to be quadrature-modulated and the primary modulated transmission data Q, a reflected wave of a frequency $f_O-f_S$ can be returned to the data reading device. Alternatively, by multiplying together the input I of the unmodulated carrier to be quadrature-modulated and the primary modulated transmission data Q, and multiplying together the input Q of the unmodulated carrier to be quadrature-modulated and the primary modulated transmission data I, a reflected wave of a frequency $f_O+f_S$ can be returned to the data reading device.

The data transmitting device may change the center frequency $f_S$ for the primary modulation.

When a clock for the transmission data is obtained by dividing the frequency $f_S$ for the primary modulation, synchronization is easily achieved because of clock unification.

According to an embodiment of the present invention, it is possible to provide a radio communication system, a radio communication device, and a radio communication method that are excellent in making it possible to improve reception sensitivity and increase communication distance by separating the transmission frequency on a reading device side from the reception frequency returned as a reflected wave from a transmitting device side.

In addition, according to an embodiment of the present invention, it is possible to provide a radio communication system, a radio communication device, and a radio communication method that are excellent in eliminating the effects of a DC offset and transmitter noise on the tag reader side to improve the reception sensitivity and increase the communication distance by shifting an unmodulated carrier of frequency $f_O$ from the tag reader side by $f_S$ on the tag side and returning a reflected wave.

In addition, according to an embodiment of the present invention, it is possible to provide a radio communication system, a radio communication device, and a radio communication method that are excellent in making it possible to improve the reception sensitivity and increase the communication distance by improving the reflection efficiency and preventing a power loss of the reflected wave when shifting the unmodulated carrier of frequency $f_O$ from the tag reader side by $f_S$ on the tag side and returning the reflected wave. Further, since the tag reader side does not need to remove a reflected wave on one side of two divided sidebands by a filter, an increase in cost can be prevented.

Other and further objects, features, and advantages of the present invention will become apparent from a more detailed description on the basis of the accompanying drawings and embodiments of the present invention to be described later.

BRIEF DESCRIPTION OF THE DRAWINGS

FIG. 1 is a diagram schematically showing the configuration of a radio communication device according to one embodiment of the present invention;

FIG. 2 is a diagram showing a modification of the radio communication device as an RFID tag shown in FIG. 1;

DETAILED DESCRIPTION

Figure 3:
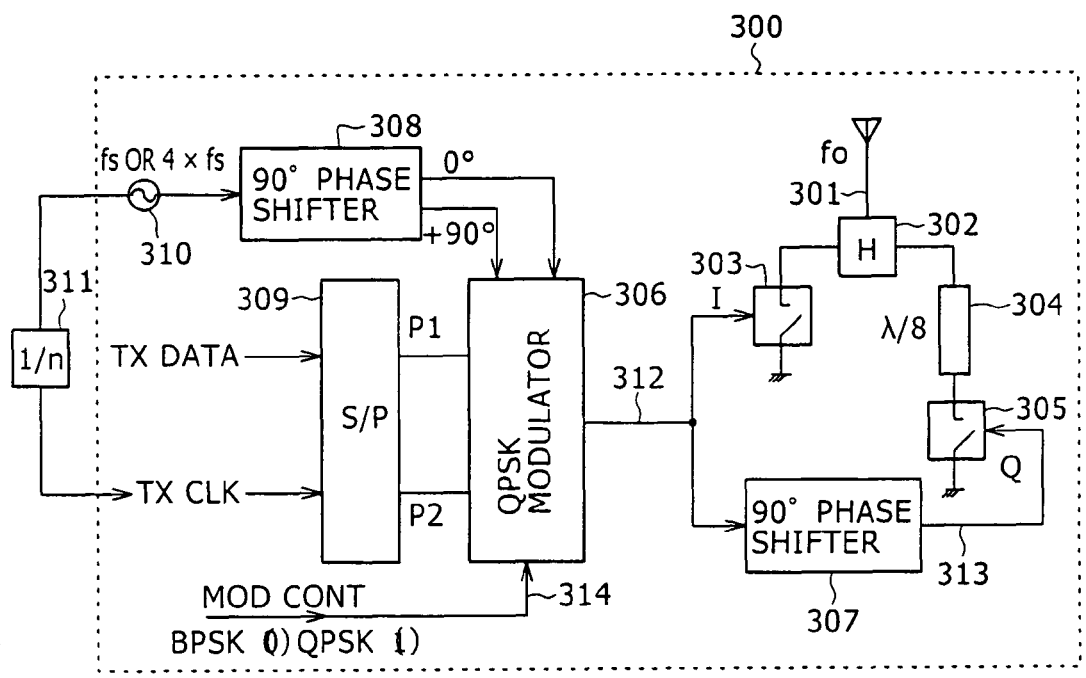
FIG. 3 is a diagram showing a concrete configuration of a radio communication device according to an embodiment of the present invention.

Preferred embodiments of the present invention will hereinafter be described in detail with reference to the drawings.

The present invention relates to an RFID system in which a tag can perform data communication without a power supply by a backscatter system.

In an ordinary RFID system, the frequency of a carrier from a reader and the center frequency of a reflected wave are the same, and since the reader side performs transmission and reception at the same frequency, a receiving unit of the tag reader is affected by a DC offset and transmitter noise.

On the other hand, a radio communication system according to an embodiment of the present invention eliminates the effects of a DC offset and transmitter noise on a tag reader side by shifting an unmodulated carrier of a frequency $f_O$ from the tag reader side by $f_S$ on a tag side and then returning a reflected wave.

FIG. 1 schematically shows the configuration of a radio communication device 10 according to one embodiment of the present invention. The radio communication device shown in the figure corresponds to a tag in an RFID system. The radio communication device receives an unmodulated carrier of a frequency $f_O$ transmitted from a tag reader, and shifts the carrier by a frequency $f_S$ by a backscatter system. Also, the radio communication device generates a modulated signal of a reflected wave in which one of sidebands $f_O+f_S$ and $f_O-f_S$ is suppressed, and then transmits the modulated signal.

As shown in FIG. 1, the radio communication device 10 includes a frequency generating unit 11, a primary modulating unit 12, and a secondary modulating unit 13.

The frequency generating unit 11 generates a center frequency $f_S$ for primary modulation. The frequency generating unit 11 may change the center frequency $f_S$ for primary modulation.

The primary modulating unit 12 subjects transmission data to primary modulation by a BPSK or a QPSK system using the center frequency $f_S$. The primary modulating unit 12 thereby generates an I-axis signal of the transmission data. Further, the primary modulating unit 12 generates a Q-axis signal of the transmission data by giving a phase difference of 90 degrees to the I-axis signal of the transmission data.

The secondary modulating unit 13 subjects the primary modulated transmission data to secondary modulation. The secondary modulating unit in the present embodiment is formed by a quadrature modulator for quadrature modulation of the unmodulated carrier of the frequency $f_O$ transmitted from the tag reader by the backscatter system. That is, the secondary modulating unit 13 multiplies an I-axis signal and a Q-axis signal of the unmodulated carrier input thereto by the I-axis signal and the Q-axis signal of the above-described primary modulated transmission data, respectively.

Generally, when two different frequencies $f_O$ and $f_S$ are subjected to a frequency operation, frequency components $f_O+f_S$ and $f_O-f_S$ in both sidebands of $f_O$ are generated, and one can be a wave interfering with the other. On the other hand, as described above, by multiplying the I-axis signals and the Q-axis signals of the frequency signals and thus performing quadrature modulation, it is possible to generate a modulated signal of a reflected wave in which one of the frequencies $f_O+f_S$ and $f_O-f_S$ is suppressed. That is, it is possible to generate only a signal of a desired frequency component, and thus eliminate the interfering wave.

As a result of this, it is possible to improve reflection efficiency and prevent a power loss of the reflected wave, improve reception sensitivity, and increase the transmission distance. In addition, since the tag reader side does not need to remove a reflected wave on one side of the two divided sidebands by a filter, an increase in cost can be prevented.

FIG. 2 shows a modification of the radio communication device as an RFID tag shown in FIG. 1. The radio communication device shown in the figure further includes a switching unit 14.

The switching unit 14 changes the combination in which an I-axis signal and a Q-axis signal of an unmodulated carrier and an I-axis signal and a Q-axis signal of primary modulated transmission data as described above are multiplied together.

By changing the combination in which the inputs I and Q of the unmodulated carrier and the primary modulated transmission data I and Q are multiplied together, it is possible to selectively generate a modulated signal of a reflected wave in which one of frequencies $f_O+f_S$ and $f_O-f_S$ is suppressed.

Specifically, by multiplying together the input I of the unmodulated carrier to be quadrature-modulated and the primary modulated transmission data I and multiplying together the input Q of the unmodulated carrier to be quadrature-modulated and the primary modulated transmission data Q, a reflected wave signal of a frequency $f_O-f_S$ can be returned to the tag reader. Alternatively, by multiplying together the input I of the unmodulated carrier to be quadrature-modulated and the primary modulated transmission data Q and multiplying together the input Q of the unmodulated carrier to be quadrature-modulated and the primary modulated transmission data I, a reflected wave signal of a frequency $f_O+f_S$ can be returned to the tag reader.

FIG. 3 shows a concrete configuration of a radio communication device according to an embodiment of the present invention. The radio communication device shown in the figure operates as a tag in an RFID system, and is capable of QPSK radio communication by the backscatter system with improved reflection efficiency and an unwanted spectrum suppressed. This radio communication device is characterized in that an image rejection type backscatter modulator is used to extract a frequency component on only one side of a modulated wave.

Reference numeral 300 denotes an image rejection type backscatter modulator. This backscatter modulator 300 includes an antenna 301, a splitter/synthesizer 302, high-frequency switches 303 and 305, and a λ/8 phase shifter 304. Generally, the high-frequency switches 303 and 305 are formed by a diode, a GaAs switch or the like, and the phase shifter 304 is formed by a strip line or the like. The parts indicated by reference numerals 301 to 305 form a quadrature modulation unit.

A signal received by the antenna 301 is branched into two signals by the splitter/synthesizer 302. One high-frequency switch 303 is turned on to terminate the antenna 301 by an antenna impedance and thus absorb the radio wave from a tag reader, and the switch is turned off to reflect the radio wave from the tag reader. That is, the high-frequency switch 303 creates total reflection in an open state and a short state according to data, and thus operates as a BPSK modulator with a phase difference of 180 degrees.

The other high-frequency switch 305 similarly absorbs or reflects the radio wave from the tag reader by being turned on/off. However, since the λ/8 phase shifter 304 is inserted at an intermediate point, the high-frequency switch 305 operates as a BPSK modulator advanced in phase in both directions by a total of λ/4, that is, 90°.

Thus, the two high-frequency switches 303 and 305 and the phase shifter 304 can form a backscatter type quadrature modulator. Suppose in this case that a signal controlled by the high-frequency switch 303 is an I-axis signal and that a signal controlled by the high-frequency switch 305 is a Q-axis signal. Transmission data is given to the I and the Q to thereby form a backscatter type QPSK modulator. However, a shift of frequency of the reflected wave cannot be realized. Therefore, a function of shifting the frequency by $f_S$ is required.

Reference numerals 306 to 311 in FIG. 3 generate an I-axis signal and a Q-axis signal of transmission data for shifting the frequency by $f_S$.

First, an S/P converter unit 309 subjects transmission data (TX DATA) and a transmission clock (TX CLK) to a serial-to-parallel conversion including Gray coding. Suppose that the output is P1 and P2. Specifically, transmission data 00 is converted into (P1=0, P2=0); transmission data 01 is converted into (P1=0, P2=1); transmission data 10 is converted into (P1=1, P2=0); and transmission data 11 is converted into (P1=1, P2=1).

A shift clock oscillator 310 is required to shift the frequency by $f_S$. This oscillator oscillates at $f_S$ or four times $f_S$. An output of the shift clock oscillator 310 is divided into two signals of 0° and 90° in a 90° phase shifter 308.

The 90° phase shifter 308 can be easily created from a clock of four times $f_S$ when the 90° phase shifter 308 is formed by a digital circuit. Also, an analog delay line may be used without use of a clock of four times $f_S$. The two signals different from each other in phase by 90° are input to a QPSK modulator 306.

The QPSK modulator 306 generates, for example, four signals of $f_S$ different from each other in phase by 90° from the two signals from the phase shifter 308. The QPSK modulator 306 generates a digital QPSK signal by selecting the four signals according to the transmission data P1 and P2. Let this digital QPSK signal be an I-axis signal 312. Further, let a Q-axis signal 313 be a signal obtained by delaying the phase of the I-axis signal 312 by 90° using a 90° phase shifter 307.

The modulation system of the QPSK modulator 306 is controlled by a modulation switching signal (MOD CONT) 314 so that switching can be performed between modulation systems QPSK and BPSK. For example, MOD CONT=0 at the time of BPSK modulation, and MOD CONT=1 at the time of QPSK modulation.

The I-axis signal 312 and the Q-axis signal 313 described above are subjected to backscatter modulation by the above-described quadrature modulation unit. Thereby, a spectrum can be obtained in which one side of the QPSK spectra occurring on both sides of a carrier frequency is attenuated.

Letting A (=±1) and B (=±1) be the P1 and P2 data for calculation, $X=2\pi f_S$, and $Y=2\pi f_O$, the QPSK modulated I-axis signal 312 and the Q-axis signal 313 delayed in phase by 90° with respect to the I-axis signal 312 can be expressed as follows:

$$I = A\cos X + B\sin X, \quad Q = A\sin X - B\cos X \quad (1)$$

The above signals are subjected to quadrature modulation by the quadrature modulation unit using the unmodulated carrier $f_O$ from the tag reader. A modulated wave signal reflected by the antenna 301 is as follows:

$$\begin{aligned}
&(A\cos X + B\sin X) \times \cos Y + (A\sin X - B\cos X) \times \sin Y \\
&= A\cos X \cos Y + B\sin X \cos Y + A\sin X \sin Y - B\cos X \sin Y \\
&= \frac{1}{2}\left\{ \begin{array}{l} A\cos(X+Y) + A\cos(X-Y) + B\sin(X+Y) + B\sin(X-Y) \\ -A\cos(X+Y) + A\cos(X-Y) - B\sin(X+Y) + B\sin(X-Y) \end{array} \right\} \\
&= A\cos(X-Y) + B\sin(X-Y)
\end{aligned} \quad (2)$$

The above equation indicates that the reflected modulated wave appears on only the $f_O-f_S$ side of both sidebands of $f_O$. In addition, by connecting the I and the Q in an opposite manner, it is possible to generate the modulated wave on only the $f_O+f_S$ side.

On the other hand, when modulation is performed on only the I side, the modulated wave at a terminal of the antenna 301 is as follows:

$$\begin{aligned}
&\frac{1}{2}\{A\cos(X+Y) + A\cos(X-Y) + B\sin(X+Y) + B\sin(X-Y)\} = \\
&\frac{1}{2}\{A\cos(X+Y) + B\sin(X+Y)\} + \frac{1}{2}\{A\cos(X-Y) + B\sin(X-Y)\}
\end{aligned} \quad (3)$$

It is indicated that in this case, the modulated wave occurs in both sidebands of $f_O-f_S$ and $f_O+f_S$. It is also indicated that the signal level is halved.

The above calculation example relates to QPSK modulation. However, when in FIG. 3, P2 is set to zero at all times and P1 is set as transmission data (TX DATA), and BPSK modulation is made to be performed by setting MOD CONT=0, the above equation (2) results in A cos(X−Y), and thus a BPSK signal on the $f_O-f_S$ side is similarly obtained.

Reference numeral 311 in FIG. 3 denotes a frequency divider. The frequency divider 311 divides the frequency of the shift clock oscillator 310. By using 1, 2, 4 or the like as a frequency dividing ratio n and using an output signal of the frequency divider for the transmission clock, it is possible to generate an I-axis signal and a Q-axis signal in synchronization at an EXOR output of the 90° phase shifter 307 and the QPSK modulator 306. However, a hazard occurs because the data change point and the clock change point become the same. A measure against this is not directly related to the subject matter of the present invention, and therefore will not be described herein.

When the clock for the transmission data is obtained by dividing the frequency $f_S$ for primary modulation, synchronization can be easily achieved because of clock unification.

Figure 4:
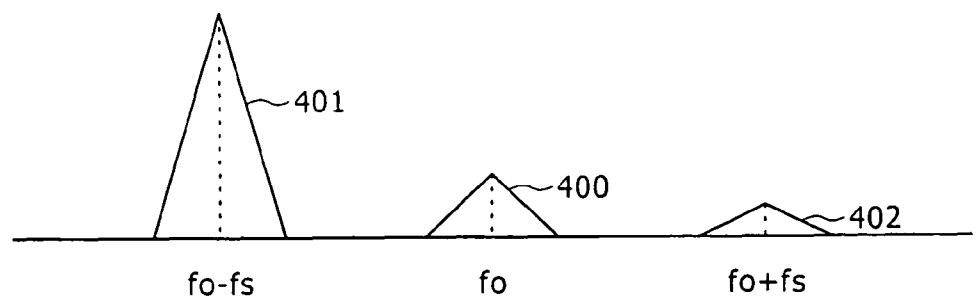
FIG. 4 is a diagram showing the spectrum of a reflected wave in the radio communication device shown in FIG. 3.

FIG. 4 shows the spectrum of the thus generated reflected wave. Reference numeral 401 denotes the QPSK modulated wave at a center frequency $f_O-f_S$. Reference numeral 400 denotes a leakage component of the QPSK modulated wave at a center frequency $f_O$, and reference numeral 402 denotes a leakage component of the QPSK modulated wave at a center frequency $f_O+f_S$. Both leakage components are caused by an imbalance of orthogonality at each of $f_O$ and $f_S$, and are not caused ideally.

Figure 5:
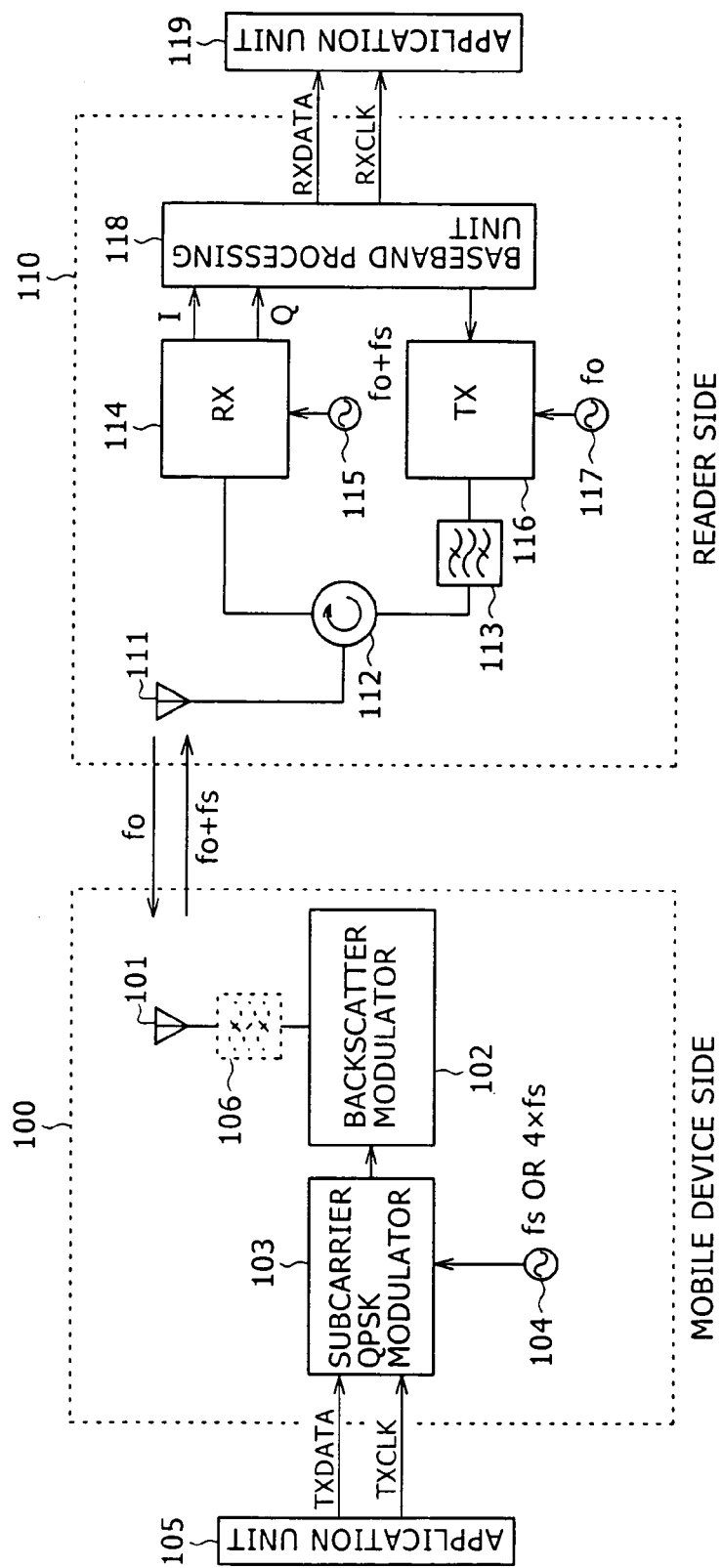
FIG. 5 is a diagram showing an example of the configuration of an RFID system in which a tag side shifts the reception frequency $f_O$ by a predetermined center frequency $f_S$ in either a positive direction or a negative direction, and returns a reflected wave.
Figure 6:
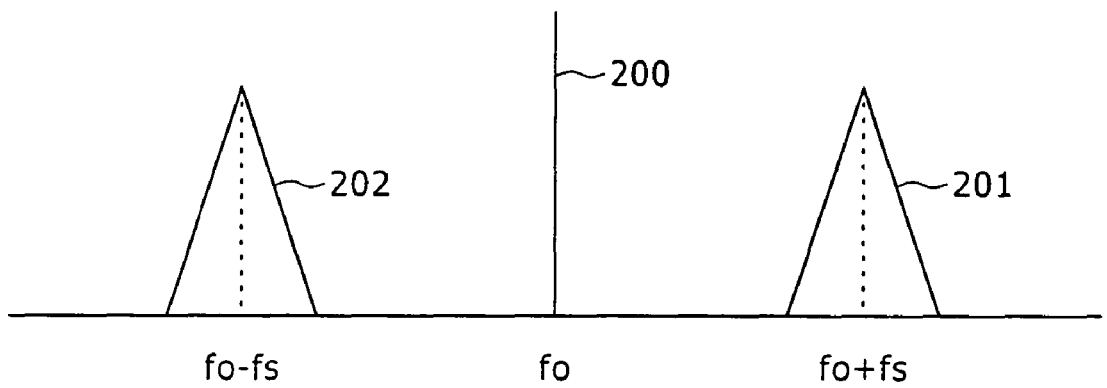
FIG. 6 is a diagram showing the spectrum of a reflected wave in the RFID system shown in FIG. 5.
Figure 7:
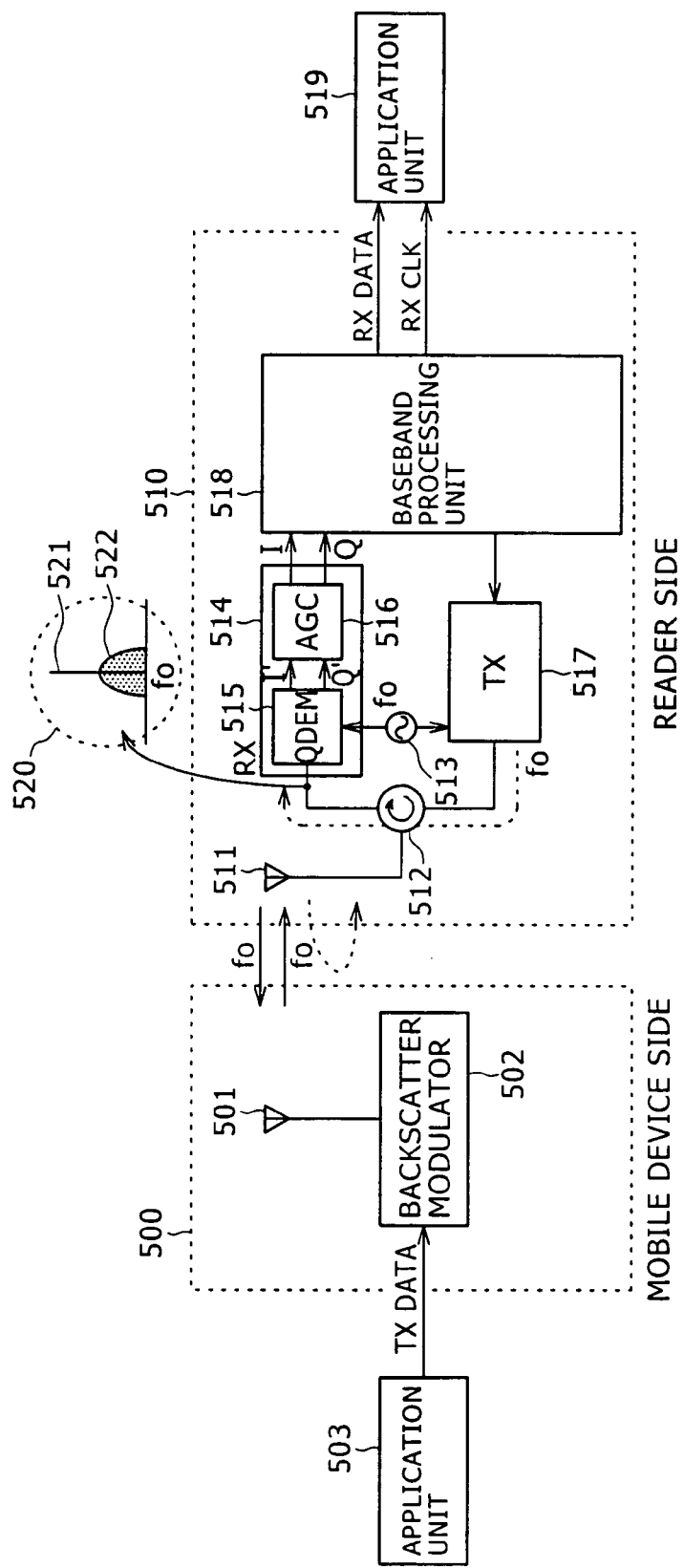
FIG. 7 is a diagram showing an example of the configuration of a radio communication system of a conventional backscatter system.

The transmitting and receiving device 110 shown in FIG. 5 can be used as it is as the tag reader for receiving and demodulating the above-described $f_O+f_S$ modulated wave, and therefore a description thereof will not be made in order to avoid repetition of the description.

By the above method, it is possible to realize a radio transmission device for BPSK or QPSK modulation by the backscatter system, which device improves reflection efficiency and suppresses an unwanted spectrum.

The present invention has been explained above in detail with reference to specific embodiments thereof. It is obvious, however, that modifications and substitutions in the embodiments may be made by those skilled in the art without departing from the spirit of the present invention. That is, the present invention has been disclosed in a form that is illustrative and contents described in the present specification are not to be construed in a restrictive manner. In order to determine the spirit of the present invention, the section of claims is to be considered.

The invention claimed is:

1. A radio communication system for performing data communication by a backscatter system using absorption and reflection of a received radio wave, the radio communication system comprising:

a data reading device operable to transmit an unmodulated carrier of frequency $f_O$; and a data transmitting device operable to subject transmission data to primary modulation using a center frequency $f_S$ to produce a primary modulated signal, and to subject the primary modulated signal to secondary modulation by multiplying the primary modulated signal by an input of the unmodulated carrier of the backscatter system to generate a reflected modulated wave in which one of frequencies $f_O+f_S$ and $f_O-f_S$ is suppressed;

the data reading device being further operable to receive the reflected modulated wave from the data transmitting device, the data transmitting device being further operable to subject the transmission data to primary modulation using the center frequency $f_S$ to generate transmission data I and transmission data Q, the transmission data Q being different in phase by 90 degrees from the transmission data I, the data transmitting device being further operable to perform secondary modulation by multiplying inputs I and Q of the unmodulated carrier for backscatter type quadrative modulation by the transmission data I and the transmission of Q in a desired multiplication combination, and the data transmitting device having a changing unit operable to select the desired multiplication combination in which the inputs I and Q of the unmodulated carrier for quadrative modulation and the transmission data I and the transmission data Q are multiplied together from among a first multiplication combination and a second multiplication combination, in which in the first multiplication combination the input I of the unmodulated carrier for quadrative modulation and the transmission data I are multiplied together and the input Q of the unmodulated carrier for quadrative modulation and the transmission data Q are multiplied together, and in the second multiplication combination the input I of the unmodulated carrier for quadrative modulation and the transmission data Q are multiplied together and the input Q of the unmodulated carrier for quadrative modulation and the transmission data I are multiplied together, so as to selectively generate a modulated signal of the reflected wave in which one of the frequencies $f_O+f_S$ and $f_O-f_S$ is suppressed.

2. A radio communication system as claimed in claim 1, wherein the data transmitting device subjects the transmission data to primary modulation by one of a BPSK system and a QPSK system.

3. A radio communication system as claimed in claim 1, further comprising a frequency control unit operable to change the center frequency $f_S$ for the primary modulation.

4. A radio communication system as claimed in claim 1, wherein the data transmitting device obtains a clock for the transmission data by dividing the center frequency $f_S$ for the primary modulation.

5. A radio communication device for performing data communication by a backscatter system using absorption and reflection of a received radio wave, the radio communication device comprising:

a primary modulating unit operable to subject transmission data to primary modulation using a center frequency $f_S$ to produce a primary modulated signal; and a secondary modulating unit operable to perform secondary modulation by multiplying the primary modulated signal by an unmodulated carrier to generate a reflected modulated wave in which one of frequencies $f_O+f_S$ and $f_O-f_S$ is suppressed, the primary modulating unit being operable to subject the transmission data to primary modulation using the center frequency $f_S$ to generate transmission data I and transmission data Q, the transmission data Q being different in phase by 90 degrees from the transmission data I, and the secondary modulating unit having a quadrature modulator of the backscatter system, and being operable to multiply inputs I and Q of the unmodulated carrier to the quadrature modulator by the transmission data I and the transmission data Q in a desired multiplication combination, and radio communication device further comprising:

a changing unit operable to select the desired multiplication combination in which the inputs I and Q of the unmodulated carrier to the quadrature modulator and the transmission data I and the transmission data Q are multiplied together from among a first multiplication combination and a second multiplication combination, in which in the first multiplication combination the input I of the unmodulated carrier to the quadrature modulator and the transmission data I are multiplied together and the input Q of the unmodulated carrier to the quadrature modulator and the transmission data Q are multiplied together, and in the second multiplication combination the input I of the unmodulated carrier to the quadrature modulator and the transmission data Q are multiplied together and the input Q of the unmodulated carrier to the quadrature modulator and the transmission data I are multiplied together, so as to selectively generate a modulated signal of the reflected wave in which one of the frequencies $f_O+f_S$ and $f_O-f_S$ is suppressed.

6. A radio communication device as claimed in claim 5, wherein the primary modulating unit subjects the transmission data to primary modulation by one of a BPSK system and a QPSK system.

7. A radio communication device as claimed in claim 5, further comprising a frequency control unit operable to change the center frequency $f_S$ for the primary modulation.

8. A radio communication device as claimed in claim 5, wherein the primary modulating unit obtains a clock for the transmission data by dividing the center frequency $f_S$ for the primary modulation.

9. A radio communication method for performing data communication by a backscatter system using absorption and reflection of a received radio wave, the radio communication method comprising:

subjecting transmission data to primary modulation with a center frequency $f_S$ to produce a primary modulated signal; and performing secondary modulation by multiplying the primary modulated signal by an unmodulated carrier to generate a reflected modulated wave in which one of frequencies $f_O+f_S$ and $f_O-f_S$ is suppressed, the primary modulating step includes subjecting the transmission data to primary modulation using the center frequency $f_S$ to generate transmission data I and transmission data Q, the transmission data Q being different in phase by 90 degrees from the transmission data I; and the secondary modulating step includes providing a quadrature modulator of the backscatter system, multiplying inputs I and the transmission data Q of the unmodulated carrier by the transmission data I and the transmission data Q in a desired multiplication combination, and said method further comprising:

selecting the desired multiplication combination in which the inputs I and Q of the unmodulated carrier and the transmission data I and the transmission data Q are multiplied together from among a first multiplication combination and a second multiplication combination, in which in the first multiplication combination the input I of the unmodulated carrier and the transmission data I are multiplied together and the input Q of the unmodulated carrier and the transmission data Q are multiplied together, and in the second multiplication combination the input I of the unmodulated carrier and the transmission data Q are multiplied together and the input Q of the unmodulated carrier and the transmission data I are multiplied together, so as to selectively generate a modulated signal of the reflected wave in which one of the frequencies $f_O+f_S$ and $f_O-f_S$ is suppressed.

10. A radio communication method as claimed in claim 9, wherein the primary modulating step includes subjecting the transmission data to primary modulation by one of a BPSK system and a QPSK system.

11. A radio communication method as claimed in claim 9, further comprising:

changing the center frequency $f_S$ for the primary modulation.

12. A radio communication method as claimed in claim 9, wherein the primary modulating step includes obtaining a clock for the transmission data by dividing the center frequency $f_S$ for the primary modulation.

* * * * *